US012659531B2

(12) United States Patent
Park

(10) Patent No.: US 12,659,531 B2
(45) Date of Patent: Jun. 16, 2026

(54) REAL-TIME BROADCASTING SPONSORSHIP SERVER BASED ON AUTOMATIC ACTION RECOGNITION AND OPERATION METHOD THEREOF

(71) Applicant: Jung Hun Park, Seoul (KR)

(72) Inventor: Jung Hun Park, Seoul (KR)

(73) Assignee: Jung Hun Park, Seoul (KR)

( * ) Notice: Subject to any disclaimer, the term of this patent is extended or adjusted under 35 U.S.C. 154(b) by 63 days.

(21) Appl. No.: 18/715,098

(22) PCT Filed: Nov. 28, 2022

(86) PCT No.: PCT/KR2022/018962
§ 371 (c)(1),
(2) Date: May 30, 2024

(87) PCT Pub. No.: WO2023/101345
PCT Pub. Date: Jun. 8, 2023

(65) Prior Publication Data
US 2025/0030904 A1      Jan. 23, 2025

(30) Foreign Application Priority Data

Nov. 30, 2021    (KR) ........................ 10-2021-0169137

(51) Int. Cl.
*H04N 21/254*      (2011.01)
*G16Y 40/10*      (2020.01)
(Continued)

(52) U.S. Cl.
CPC ......... *H04N 21/254* (2013.01); *H04N 21/251* (2013.01); *H04N 21/44218* (2013.01); *G16Y 40/10* (2020.01)

(58) Field of Classification Search
CPC ............... H04N 21/254; H04N 21/251; H04N 21/44218; G16Y 40/10
See application file for complete search history.

(56) References Cited

U.S. PATENT DOCUMENTS

2021/0168462 A1      6/2021   April et al.

FOREIGN PATENT DOCUMENTS

| CN | 11372147 A | * 11/2021 | ........... H04N 21/234 |
| KR | 10-2015-0039252 A | 4/2015 | |

(Continued)

OTHER PUBLICATIONS

International Search Report for PCT/KR2022/018962 by Korean Intellectual Property Office dated Mar. 13, 2023.

*Primary Examiner* — Sumaiya A Chowdhury
(74) *Attorney, Agent, or Firm* — BROADVIEW IP LAW, PC

(57) ABSTRACT

The present invention relates to a real-time broadcast sponsorship server and an operation method thereof. The real-time broadcast sponsorship server according to the present invention comprises: a sponsorship management unit that collects deposited donation information and information on a mission given by a viewer of an Internet broadcast to an Internet broadcaster, and when the mission is complete, pays the donation; an action recognition unit that recognizes the action of the broadcaster on the basis of at least one of the video and speech of the broadcaster, and generates an action recognition result; and a mission completion determination unit that compares the action recognition result and the information on the mission to determine whether the mission is complete.

13 Claims, 9 Drawing Sheets

VIEWER

BROADCASTER

(51) Int. Cl.
    H04N 21/25       (2011.01)
    H04N 21/442     (2011.01)

(56)             References Cited

FOREIGN PATENT DOCUMENTS

| KR | 10-2020-0013887 A | 2/2020 | |
|----|-------------------|--------|--|
| KR | 10-2220762 B1 | 2/2021 | |
| KR | 102268975 B1 | 6/2021 | |
| WO | WO-2022120474 A1 * | 6/2022 | ............. G06F 3/017 |

\* cited by examiner

Figure 5:
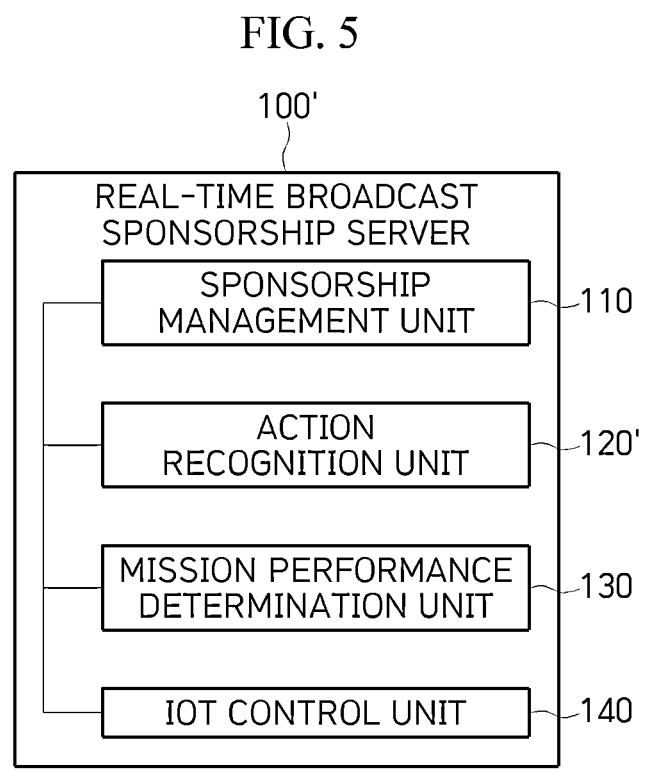

REAL-TIME BROADCAST
SPONSORSHIP SERVER

| SPONSORSHIP MANAGEMENT UNIT | 110 |

| ACTION RECOGNITION UNIT | 120' |

| MISSION PERFORMANCE DETERMINATION UNIT | 130 |

| IOT CONTROL UNIT | 140 |

Figure 7:
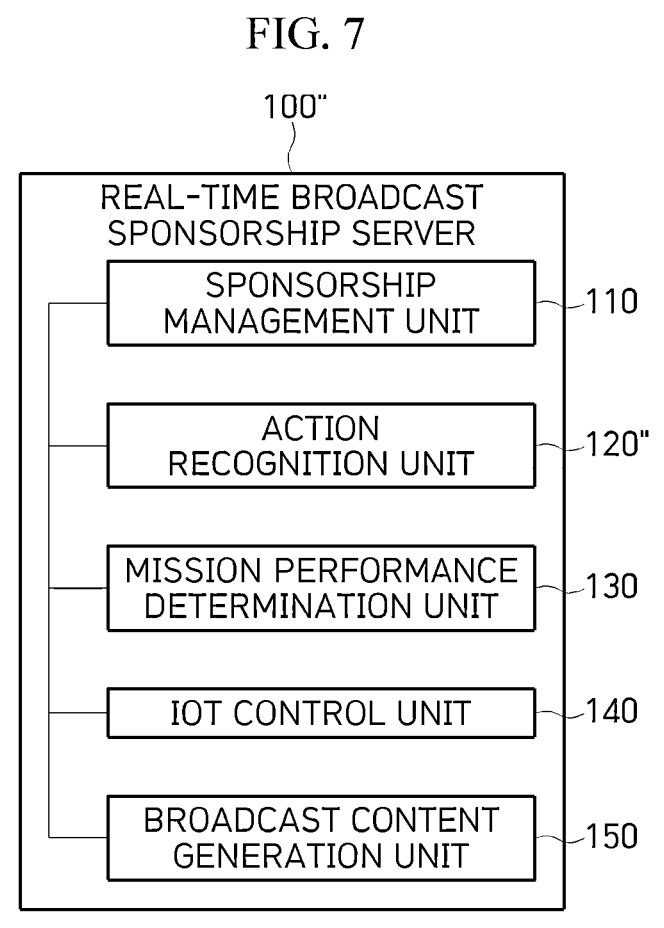

REAL-TIME BROADCAST
SPONSORSHIP SERVER

| SPONSORSHIP MANAGEMENT UNIT | ~110 |

| ACTION RECOGNITION UNIT | ~120" |

| MISSION PERFORMANCE DETERMINATION UNIT | ~130 |

| IOT CONTROL UNIT | ~140 |

| BROADCAST CONTENT GENERATION UNIT | ~150 |

REAL-TIME BROADCASTING SPONSORSHIP SERVER BASED ON AUTOMATIC ACTION RECOGNITION AND OPERATION METHOD THEREOF

CROSS-REFERENCE TO RELATED APPLICATIONS

This application is a National Phase Entry Application of PCT Application No. PCT/KR2022/018962 filed on Nov. 28, 2022, which claims priority to Korean Patent Application No. 10-2021-0169137 filed on Nov. 30, 2021, in the Korean Intellectual Property Office, the entire contents of which are hereby incorporated by reference in its entirety.

TECHNICAL FIELD

The present invention relates to a real-time broadcasting sponsorship server and an operation method thereof. More particularly, the present invention relates to a real-time broadcasting sponsorship server that allows a real-time broadcast viewer to assign a mission to a broadcaster, and when the broadcaster performs the mission, pays a donation to the broadcaster, and an operation method thereof.

BACKGROUND ART

Recently, real-time Internet broadcasting services have been becoming active in various fields. For example, Internet broadcasters perform real-time personal broadcasts using domestic and foreign broadcast platforms such as YouTube, Afreeca TV, Twitch, and Kakao TV.

Viewers may access the platform to watch broadcasts or participate in chatting, and support broadcasters by sponsoring the broadcasters (for example, with star balloons or donations). For example, viewers may purchase sponsorship items (or cyber money, etc.) equivalent to a certain amount through a real-time broadcast platform (or real-time sponsorship platform) and use the purchased sponsorship items to sponsor the broadcasters. Sponsored broadcasters may pay a portion of a fee to the platform and then receive an amount equivalent to the remaining sponsored items.

The conventional viewer-participatory real-time broadcast has been performed in a way in which viewers select and upload text, images, or moving images they wish to share with their sponsorship, broadcasters perform two-way communication by confirming the sponsorship and sharing the content with the viewers, or when the viewers assign their desired missions to the broadcasters and the broadcasters perform the missions, the viewers confirm that the missions have been performed and sponsor the broadcasters. Looking at the broadcast platforms such as Afreeca TV or Twitch, the broadcasters gain financial profits through such events, and the viewers gain a sense of accomplishment by seeing the text, images, moving images, or actions of the broadcasters displayed in a broadcast window.

However, the conventional sponsorship method for viewer-participatory real-time broadcasting does not automatically link the mission performance of the broadcasters with the sponsorship of the viewers, and therefore has limitations in creating more interesting and creative content.

DISCLOSURE

Technical Problem

The present invention has been derived from the above background, and an object of the present invention provides a real-time broadcasting sponsorship server that allows a sponsor of real-time broadcasting to assign his/her desired mission to a broadcaster, and automatically recognizes when the broadcaster performs the mission to perform sponsorship, and an operation method thereof.

More specifically, the present invention provides a real-time broadcasting sponsorship server that, when a real-time Internet broadcast viewer selects a specific mission and deposits a certain donation or sponsorship item and then an Internet broadcaster performs the mission, automatically pays the deposited donation or sponsorship item to the Internet broadcaster according to action recognition results such as motion recognition or audio recognition.

The object of the present invention is not limited to the objects mentioned above, and other objects not mentioned could be clearly understood by those skilled in the art to which the present invention pertains from the description below.

Technical Solution

To achieve the above object, according to one embodiment of the present invention, a real-time broadcasting sponsorship server based on automatic action recognition includes: a sponsorship management unit that collects information on a mission and donation deposit information requested by an Internet broadcast viewer from an Internet broadcaster and processes payment of the donation when the mission is completely performed; an action recognition unit that recognizes an action of the broadcaster based on at least one of video and audio of the broadcaster to generate an action recognition result; and a mission performance determination unit that compares the action recognition result with the information on the mission to determine whether the mission is completely performed.

The real-time broadcasting sponsorship server may further include an Internet of Things (IoT) control unit that, when the mission is completely performed, controls a broadcast auxiliary IoT device.

The information on the mission may be a name of at least one of an action, a facial expression, and a posture requested by the Internet broadcast viewer from the broadcaster.

The information on the mission may be at least one of a moving image and an image related to the action requested by the Internet broadcast viewer from the broadcaster.

According to one embodiment of the present invention, a real-time broadcasting sponsorship system based on automatic action recognition includes: an action recognition IoT device that collects at least one of video and audio of an Internet broadcaster; and a server that collects information on a mission and donation deposit information requested by an Internet broadcast viewer from the Internet broadcaster, recognizes an action of the broadcaster based on at least one of video and audio of the broadcaster to generate an action recognition result, compares the action recognition result with the information on the mission to determine whether the mission is completely performed, and processes payment of the donation.

The action recognition IoT device may acquire depth information on each part of a body of the broadcaster.

When the mission is completely performed, the server may control a broadcast auxiliary IoT device.

According to one embodiment of the present invention, a real-time broadcasting system includes: a broadcast platform system; a broadcaster terminal that generates broadcast content in which an Internet broadcaster appears and transmits the generated broadcast content to the broadcast platform system; and a viewer terminal that receives the broadcast content from the broadcast platform system and provides the received broadcast content to a viewer of the broadcast content. The broadcast platform system may collect, from the viewer terminal, information on a mission and donation deposit information that the viewer requests from the broadcaster and process payment of the donation when it is determined that the mission is completed based on the broadcast content.

According to one embodiment of the present invention, a real-time broadcasting sponsorship server based on automatic action recognition includes: a sponsorship management unit that collects information on a mission presented by any one of an Internet broadcaster and an Internet broadcast viewer and information on a reward for the mission, and processes payment of the reward when the mission is completely performed; an action recognition unit that calculates action similarity between the broadcaster and the viewer based on a moving image of the broadcaster and a moving image of the viewer; and a mission performance determination unit that determines whether the mission is completely performed depending on whether the action similarity falls within a predetermined range. The information on the reward may be at least one of prize money and a channel point under a condition on the performance completion of the mission.

According to one embodiment of the present invention, a real-time broadcasting sponsorship server includes: a sponsorship management unit that collects information on a mission and donation deposit information requested by an Internet broadcast viewer from an Internet broadcaster and processes payment of the donation when the mission is completely performed; a recognition unit that recognizes at least one of an object and a character appearing in a moving image of the broadcaster and generates a recognition result; and a mission performance determination unit that determines whether the mission is completely performed depending on whether the recognition result matches the information on the mission.

According to one embodiment of the present invention, an operation method of a real-time broadcasting sponsorship server includes: a mission request information receiving operation of receiving mission request information from a viewer terminal; a video/audio collection operation of collecting at least one of video and audio of an Internet broadcaster; an action recognition operation of generating an action recognition result of the broadcaster based on at least one of the video and audio of the broadcaster; and an action-mission matching determination operation of determining whether the action recognition result matches the mission request information.

The operation method may further include: before the video/audio collection operation, a donation deposit operation of receiving donation deposit information from the viewer terminal and matching the received donation deposit information with the mission request information, and after the action-mission matching determination operation, when the action recognition result matches the mission request information, a donation payment operation of processing the donation to be paid to the broadcaster in one of full payment and partial payment.

The operation method may further include, after the action-mission matching determination operation, when the action recognition result and the mission request information match, an auxiliary IoT control operation of operating a broadcast auxiliary IoT device.

In the action recognition operation, an action of the broadcaster may be recognized through a neural network trained using a deep learning technique.

Advantageous Effects

According to one embodiment of the present invention, by automatically operating any IoT device in connection with the case where the Internet broadcasters perform the missions assigned by the viewers, it is possible to provide the viewers with novel and interesting content and induce more sponsorship from the broadcasters' perspective.

According to one embodiment of the present invention, since it is possible to automatically evaluate whether the Internet broadcasters have performed the missions, there is no need for the broadcasters or viewers to separately confirm whether the missions have been performed, and the viewers and broadcasters may focus only on the situation, thereby increasing the broadcast immersion.

Effects which can be achieved by the present invention are not limited to the above-described effects. That is, other objects that are not described may be obviously understood by those skilled in the art to which the present invention pertains from the following description.

DESCRIPTION OF DRAWINGS

FIG. 1 is a block diagram illustrating a configuration of a real-time broadcasting system according to a first embodiment of the present invention.

FIG. 2 is a reference diagram illustrating a real-time personal broadcasting screen.

FIG. 3 is a block diagram illustrating the configuration of the real-time broadcasting system according to the first embodiment of the present invention.

FIG. 5 is a block diagram illustrating the configuration of the real-time broadcasting system according to the second embodiment of the present invention.

FIG. 6 is a block diagram illustrating a configuration of a real-time broadcasting system according to a third embodiment of the present invention.

FIG. 7 is a block diagram illustrating the configuration of the real-time broadcasting system according to the third embodiment of the present invention.

BEST MODE

Figure 4:
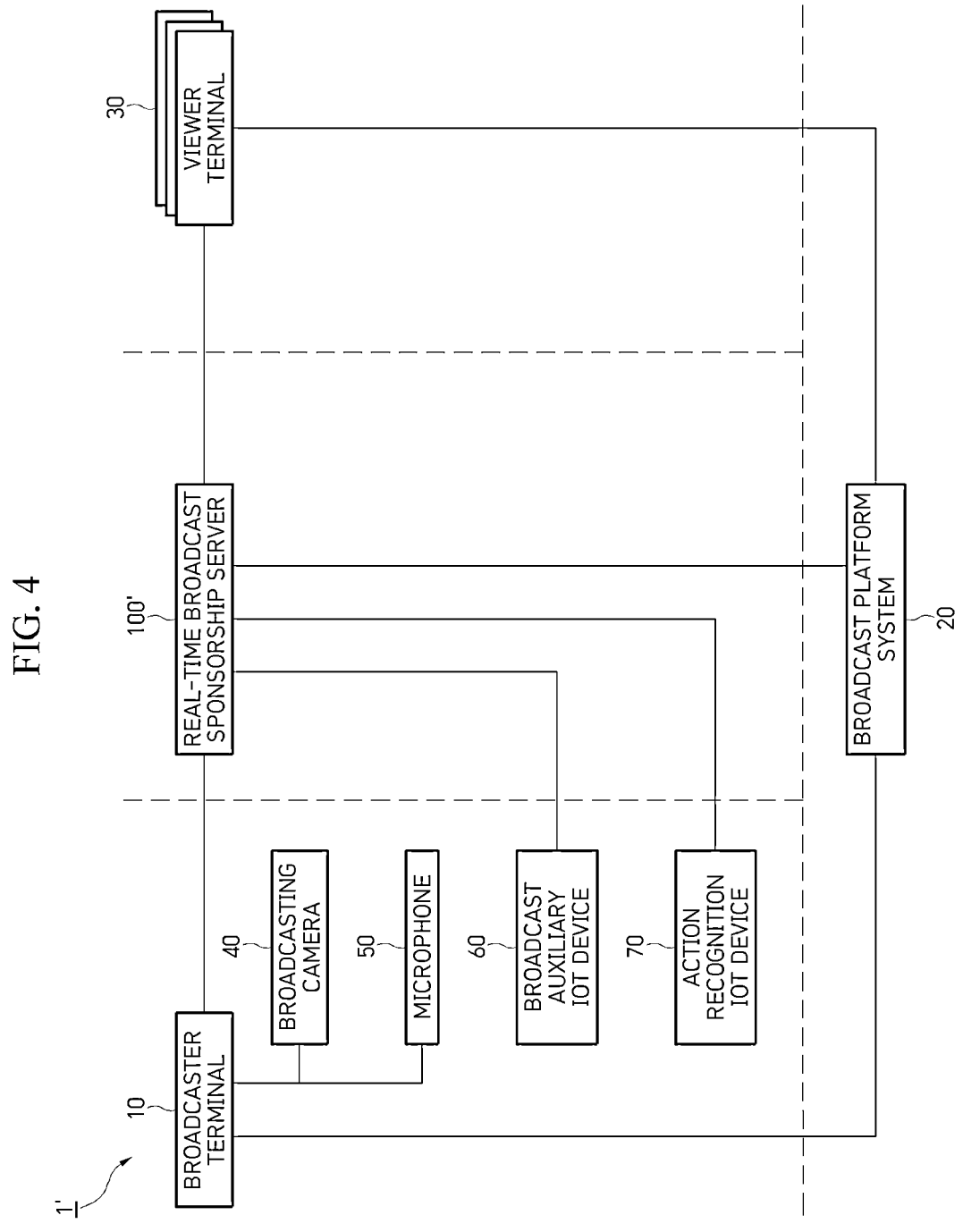
FIG. 4 is a block diagram illustrating a configuration of a real-time broadcasting system according to a second embodiment of the present invention.

Various advantages and features of the present invention and methods of accomplishing them will become apparent from the following description of embodiments with reference to the accompanying drawings. However, the present invention is not limited to exemplary embodiments to be described below, but may be implemented in various different forms, these embodiments will be provided only in order to make the present invention complete and allow those skilled in the art to completely recognize the scope of the present invention, and the present invention will be defined by the scope of the claims. Meanwhile, terms used in the present specification are for explaining exemplary embodiments rather than limiting the present invention. Unless otherwise stated, a singular form includes a plural form in the present specification. "Comprise" and/or "comprising" used in the present invention indicate(s) the presence of stated components, steps, operations, and/or elements but do(es) not exclude the presence or addition of one or more other components, steps, operations, and/or elements.

The expressions "first," "second," "1$^{st}$," "2$^{nd}$" or the like used in the present disclosure may indicate various embodiments or components regardless of a sequence and/or importance of the components, will be used only in order to distinguish one embodiment or component from the other embodiments or components, and do not limit the corresponding embodiments or components.

When it is decided that the detailed description of the known art related to the present invention may unnecessarily obscure the gist of the present invention, the detailed description therefor will be omitted.

In this specification, an Internet broadcaster (hereinafter abbreviated as "broadcaster") means any one of a host, a panelist, and a participant in an Internet broadcast, and may be any one of broadcasters appearing in video transmitted through various broadcast platforms such as a play director (PD), a creator, a streamer, a master of ceremonies (MC), a broadcasting jockey (BJ), a YouTuber, or a broadcaster.

In this specification, content refers to various types of information or content provided through the Internet, computer communication, etc. Specifically, content refers to information or content such as characters, codes, audio, sound, images, and video that are processed and distributed in a digital form for use in wired/wireless electric communication networks.

Hereinafter, embodiments of the present disclosure will be described in detail with reference to the accompanying drawings. The same means will be denoted by the same reference numerals throughout the accompanying drawings in order to facilitate the general understanding of the present invention in describing the present invention.

Figure 1:
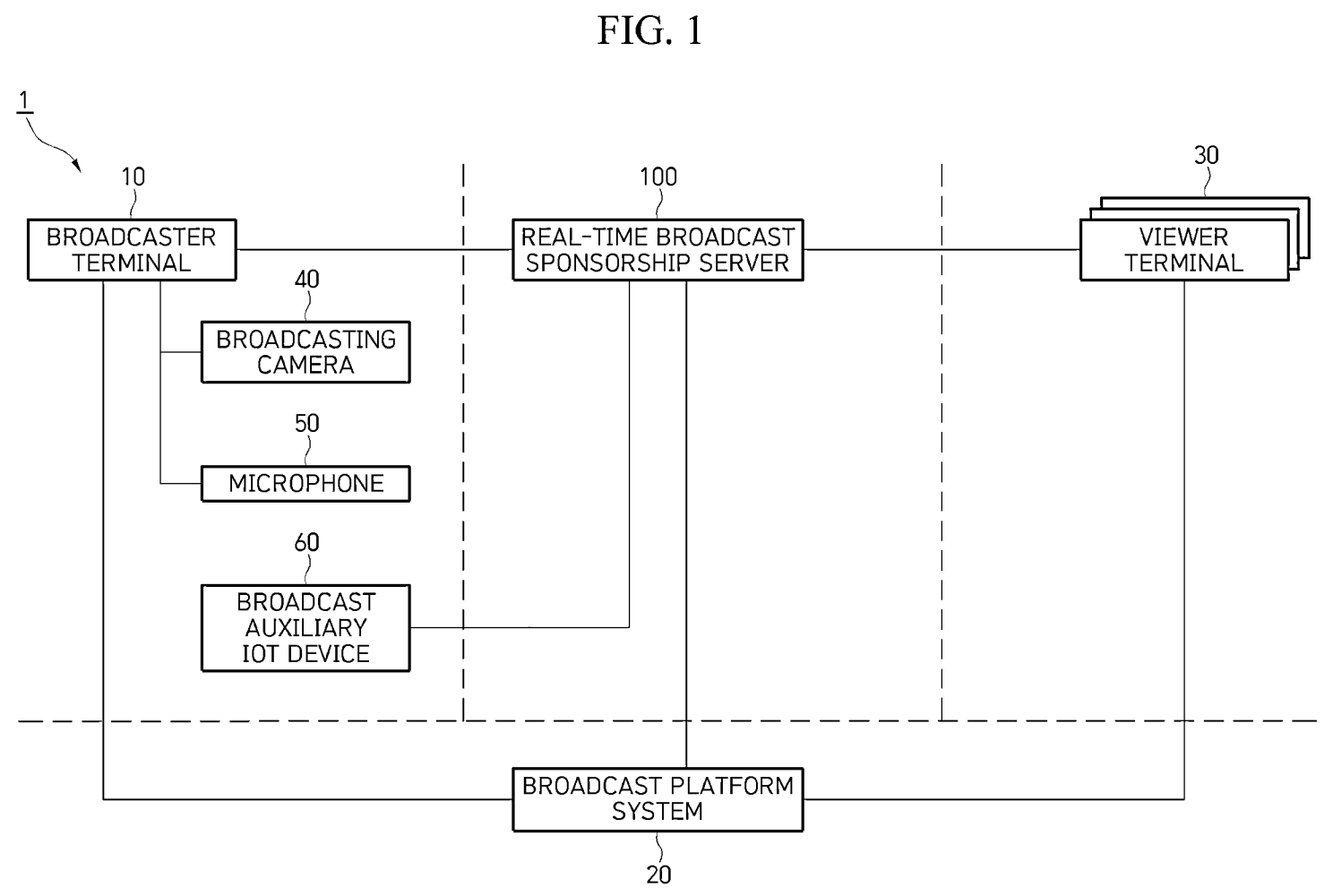

FIG. 1 is a block diagram illustrating a configuration of a real-time broadcasting system according to a first embodiment of the present invention.

As illustrated in FIG. 1, a real-time broadcasting system 1 according to a first embodiment of the present invention includes a broadcaster terminal 10, a broadcast platform system 20, a viewer terminal 30, a broadcasting camera 40, a microphone 50, and a real-time broadcasting sponsorship server 100 (hereinafter abbreviated as "server"), and may further include a broadcast auxiliary Internet of Things (IoT) device 60.

The broadcaster terminal 10 generates content for broadcasting in real time. However, the broadcaster terminal 10 is not limited thereto, and may receive already generated content from the outside. The broadcaster terminal 10 transmits content produced by the broadcaster to the broadcast platform system 20. The broadcaster terminal 10 may generate content by receiving video and audio from the broadcasting camera 40 and the microphone 50 through wired or wireless communication, but is not limited thereto. For example, the broadcaster terminal 10 may have a built-in camera module or microphone that photographs or collects audio from the broadcaster. The broadcaster terminal 10 transmits the generated content to the broadcast platform system 20 so that streaming broadcasting may be performed.

The broadcaster terminal 10 may exchange information with the server 100 through wired/wireless communication. The server 100 may transmit information (hereinafter referred to as "mission request information") on an action requested by a viewer from a broadcaster and donation/sponsorship item deposit information (hereinafter referred to as "donation deposit information") to the broadcaster terminal 10. In this case, the broadcaster terminal 10 may display the mission request information and the donation deposit information on the screen so that the broadcaster may recognize the mission request information and the donation deposit information.

The broadcast platform system 20 receives content transmitted from the broadcaster terminal 10. The broadcast platform system 20 may be connected to the plurality of broadcaster terminals 10 and may have a plurality of channels connected to each broadcaster terminal 10. The viewer terminal 30 connects to each channel to watch content transmitted by the corresponding broadcaster terminal 10. The broadcast platform system 20 may synthesize various effects set by the broadcaster terminal 10 with the received video, and synthesize chatting transmitted by the viewer terminal 30 with the video.

In addition, the broadcast platform system 20 may exchange information with the server 100 through the wired/wireless communication. The broadcast platform system 20 may synthesize the information (e.g., information on the mission performance request of the viewer and the mission performance result of the broadcaster or information that the donation/sponsored item has been paid to the broadcaster) provided by the server 100 with the video. The content synthesized in the broadcast platform system 20 may be transmitted to the plurality of viewer terminals 30 connected to the same channel in the broadcast platform system 20. In addition, when the broadcast platform system 20 receives the mission request information and the donation deposit information from the viewer terminal 30, the broadcast platform system 20 may transmit the information to the server 100. The viewer terminal 30 is connected to a specific channel of the broadcast platform system 20 and provides content transmitted by the broadcaster terminal 10 connected to the specific channel to the viewer. In other words, the broadcast platform system 20 transmits the content received by the broadcaster terminal 10 to the viewer terminal 30 connected to the corresponding channel. The broadcast platform system 20 enables the viewer terminal 30 connected to the corresponding broadcast channel to provide content transmitted in real time from the broadcaster terminal 10 to the viewer. When the plurality of viewers access a specific channel to watch a broadcast, the plurality of viewer terminals 30 exist in the real-time broadcasting system 1.

The viewer terminal 30 transmits the information ("mission request information") on the action requested by the viewer from the broadcaster to the server 100 while connected to the server 100. When the plurality of broadcasters are broadcasting or participating in the broadcast on one Internet broadcasting channel, the mission request information may include information on a broadcaster to perform the action requested by the viewer. In addition, the viewer terminal 30 may deposit a donation or sponsorship item for the broadcaster along with the mission transmission. The viewer terminal 30 transmits the donation or sponsorship item deposit information to the server 100. The viewer terminal 30 may be installed with an application (app) for receiving the broadcast from the broadcast platform system 20 and an application (or app) for communication between the viewer terminal 30 and the server 100.

In this specification, the broadcaster terminal 10 or viewer terminal 30 may include at least one of all types of wireless communication devices, such as a desktop personal computer, a laptop personal computer, a netbook computer, a smartphone, a smartpad, a tablet personal computer (PC), a mobile phone, a video phone, a personal communication system (PCS), a Global System for Mobile Communications (GSM) device, a personal digital cellular (PDC), a personal handyphone system (PHS), a personal digital assistant (PDA), an International Mobile Telecommunications (IMT)-2000 device, a code division multiple access (CDMA)-2000 device, a W-CDMA device, a wireless broadband Internet (WiBro) terminal, a portable multimedia player (PMP), a wearable device (e.g. smart glasses, a head-mounted-device (HMD), etc.), or a smart watch, and wired communication devices such as a desktop computer and a smart TV, and may further include a camera module for photographing or a microphone for audio collection.

The broadcasting camera 40 and the microphone 50 provide video and audio to the broadcaster terminal 10 and the server 100 through the wired/wireless communication. The broadcaster terminal 10 generates content from the provided video and audio. The server 100 recognizes the action of the broadcaster based on the video and audio provided by the broadcasting camera 40 and the microphone 50, and determines whether the mission assigned by the viewer matches the action of the broadcaster.

The server 100 is connected to the broadcaster terminal 10, the broadcast platform system 20, and the viewer terminal 30 in the wireless or wired manner to exchange information. The server 100 collects the video and audio information of the broadcaster from the broadcaster terminal 10. When the broadcasting camera 40 and the microphone 50 are IoT devices, the server 100 may collect the video and audio of the broadcaster from the broadcasting camera 40 and the microphone 50 instead of the broadcaster terminal 10. In addition, the server 100 may operate the broadcast auxiliary IoT device 60 by transmitting a control signal to the broadcast auxiliary IoT device 60 under certain conditions.

The server 100 may transmit, to the viewer terminal 30, a list (hereinafter referred to as a "mission list") of actions that may be requested from the broadcaster, and the viewer terminal 30 may display the mission list on the screen and allow the viewer to select the displayed mission list. The server 100 may directly transmit the mission list to the viewer terminal 30, or may transmit the mission list to the viewer terminal 30 indirectly via the broadcast platform system 20. When the viewer selects one of the actions listed in the mission list, the viewer terminal 30 transmits the information ("mission request information") on the action requested by the viewer from the broadcaster to the server 100.

The mission request information may have various forms. There may be a method of selecting a promised mission from the mission list, and information on actions (e.g., posture, facial expression) or audio content requested by the viewer may be added. In addition, when a viewer assigns a prohibited action or word (audio) and the broadcaster performs the action or word (audio), a method of deducting donations according to the number of times may be applied. An example is described below.

① A viewer may register the desired posture as a mission, and the viewer may register the desired posture as a mission by adding an image or video showing the desired posture to the mission request information through the viewer terminal 30. As a specific example, a viewer photographs video of himself/herself doing a handstand with his/her smartphone, captures a scene where the viewer does the handstand to generate an image, and transmits the image from the viewer terminal 30 to the server 100 to register the image as a mission, thereby requesting a broadcaster to imitate an action (doing a handstand) appearing in the image.

② A viewer uses an application (app) installed on the viewer terminal 30 to register an action (arm heart) of making a heart with his/her arm by moving a joint as a mission and displays the mission on the broadcaster terminal 10 via the viewer terminal 30 and the server 100, thereby transmitting the corresponding mission to the broadcaster.

③ A viewer may specify a facial expression to be prohibited for a certain period of time as a mission. In order to confirm whether this mission is performed, an action recognition model of the action recognition unit 120 should use a model capable of facial expression analysis. For example, a viewer may specify, as a mission, that a broadcaster play a game for 30 minutes without frowning. When the broadcaster performing a game broadcast frowns while playing the game, the server 100 determines that the mission has been failed, and the donation may be deducted or may not be paid.

④ Missions related to video and audio may be assigned. By installing a video processing/analysis model in the action recognition unit 120 to identify characters or objects appearing in a video of a broadcaster, it may be confirmed whether a mission has been achieved. The video processing/analysis model may be used alone, or may be used to confirm whether the mission has been achieved in combination with an action recognition model or an audio recognition model. For example, content of various missions, such as playing a difficult game without swearing (with a deduction of 1,000 won when a broadcaster fails the mission), entering YouTube and accumulating 1,000 won in a donation when a title of a video shown at the top of YouTube includes "news," entering YouTube and accumulating donations based on the number of people who appear in the moving image when turning on a moving image, and accumulating 1,000 won when a League of Legends game is played in a 5:5 Player vs. Player (PvP) manner and when an opponent or friendly team member selects a specific character, may be assigned in relation to video and audio.

The mission request information from the viewer terminal 30 may be transmitted to the server 100 through the broadcast platform system 20. As described above, the viewer terminal 30 may deposit the donation or sponsorship item for the broadcaster along with the mission transmission. In this case, the viewer terminal 30 may transmit the donation/sponsorship item deposit information ("donation deposit information") to the server 100 along with the mission request information. For example, the viewer may purchase a sponsorship item (or cyber money, etc.) through the broadcast platform system 20 or the server 100 and deposit the sponsorship item along with the mission request. In this case, the quantity information of the deposited sponsorship item is transmitted from the viewer terminal 30 to the server 100.

As another example, the server 100 transmits the mission list to the broadcast platform system 20. In this case, the broadcast platform system 20 synthesizes the mission list with the video, transmits the synthesized video to the viewer terminal 30, and transmits the mission request information and the donation deposit information received from the viewer terminal 30 to the server 100.

The server 100 may combine one or more types of mission request information and donation deposit information received from the viewer terminal 30 or the broadcast platform system 20 and transmit the combined mission request information and donation deposit information to the broadcaster terminal 10 or the broadcast platform system 20. When the broadcaster terminal 10 receives the mission request information and the donation deposit information, the broadcaster terminal 10 may display the mission request information and the donation deposit information on the screen, and the broadcaster may recognize the mission request information and the donation deposit information. When the broadcast platform system 20 receives the mission request information and the donation deposit information, the broadcast platform system 20 may synthesize the corresponding information with video and transmit the video to the plurality of viewer terminals 30 connected to the same broadcast channel.

The server 100 collects at least one of the video and audio of the broadcaster from the broadcaster terminal 10. As another example, the server 100 may collect at least one of the broadcast video and audio from the broadcast platform system 20. As another example, the server 100 may collect at least one of the broadcast video and audio from the broadcasting camera 40 and the microphone 50. The server 100 recognizes the action of the broadcaster based on at least one of the collected video and audio of the broadcaster, and determines whether the action matches the action (mission) requested by the viewer. In this specification, "matching" is considered to include not only the case where the action of the broadcaster recognized by the server 100 and the action designated as the mission by the viewer match, but also the case where the probability that the action of the broadcaster is the action selected (requested) by the viewer as the mission falls within a certain range. For example, the action selected by the viewer as the mission is "making a finger heart," and as a result of the server 100 recognizing the action of broadcaster based on the video in which the broadcaster appears, when the probability that the broadcaster performs the "making a finger heart" action is 80%, when the reference probability is more than 60%, it is considered that the action recognition result matches the mission request information.

As described above, the server 100 determines whether the action recognition result matches the mission request information, and when the action recognition result does not match the mission request information, the server 100 collects the video and audio of the broadcaster until the end of the broadcast or for a predetermined time to recognize the action.

When the server 100 determines that the action recognition result of the broadcaster matches the mission request information, the server 100 transmits the information (hereinafter referred to as "mission performance completion information") that the mission performance has been completed to the broadcast platform system 20. The broadcast platform system 20 may synthesize the mission performance completion information with video and transmit the video to the plurality of viewer terminals 30. In addition, the server 100 may transmit information (hereinafter referred to as "donation payment information") that the donation/sponsorship item is paid along with the mission performance completion information to the broadcast platform system 20. In this case, the broadcast platform system 20 may synthesize the mission performance completion information and the donation payment information with video and transmit the video to the plurality of viewer terminals 30. In addition, when the broadcaster performs the mission requested by the viewer, the server 100 performs processing so that the deposited donation or sponsorship item is paid to the broadcaster who performs the mission. In other words, when the viewer terminal 30 deposits a donation into an account managed by the server 100 or when the viewer terminal 30 purchases the sponsorship item through the server 100, the server 100 performs processing so that the donation or sponsorship item is paid to the broadcaster when the mission performance of the broadcaster is completed. Meanwhile, when the broadcast platform system 20 manages the donation deposit or the viewer terminal 30 purchases the sponsorship item through the broadcast platform system 20, the server 100 transmits a message requesting the payment for the donation or the sponsorship item to the broadcast platform system 20 when the mission performance of the broadcaster is completed.

Meanwhile, the real-time broadcasting system according to the first embodiment of the present invention may further include a broadcast auxiliary IoT device 60. In this case, the server 100 controls the broadcast auxiliary IoT device 60. The broadcast auxiliary IoT device 60 is a device to which the IoT is applied. For reference, in the IoT, a plurality of objects are connected to each other based on the Internet. Mutual exchange of information is possible between things connected to each other based on the Internet.

For example, the broadcast auxiliary IoT device 60 according to the present invention may be any one of a fan, a blower, an air conditioner, a boiler, lighting, a humidifier, a dehumidifier, an air purifier, a robot vacuum cleaner, a smartphone, a PC (including a broadcasting computer as well as a separate computer), a speaker, a monitor (including a broadcasting monitor), a camera, an outlet, a multi-tap, a scale, various types of exercise equipment such as a treadmill or a cycle machine, a printer, a fax machine, a multi-function device, various types of power switch modules, a power adapter, a door lock, a video phone, a TV receiver (set-top box), a vehicle, a black box, a navigation device, an infrared detector, a feeding device for pets, a play device for pets, and a money gun (cash gun) to which the IoT is applied, but is not limited to the examples listed.

The server 100 may enable the broadcast auxiliary IoT device 60 to operate under specific conditions. For example, in the middle of summer, when a broadcaster performs a mission (dancing) requested by a viewer, the server 100 may operate the electric fan or air conditioner 60 to which the IoT is applied. As another example, when the broadcaster performs the mission requested by the viewer, the server 100 may operate the money gun 60 to discharge banknotes accommodated inside the money gun 60. For reference, a money gun is a device that may accommodate banknotes inside and discharge the banknotes contained inside to the outside when a trigger is pulled or a control signal is received. The server 100 may operate the money gun 60 to discharge banknotes equal to the sponsorship amount to be paid to the broadcaster, or may control the money gun 60 to discharge a certain amount of banknotes only for a visual effect of receiving sponsorship. In addition, when a broadcaster says a specific word, a keyboard of the broadcaster may not work, or a monitor screen of the broadcaster may not be visible for 10 seconds.

As another embodiment of the present invention, the mission may not be assigned in advance, and there may be a mission in the form in which a broadcaster follows the action of the viewer during broadcasting or a viewer follows the broadcaster.

11

① When the mission request information is "following the action of the viewer (a specific viewer is designated)," the server 100 may determine whether the mission performance is completed by a method of receiving a video of a viewer from the target viewer terminal 30 or receiving a video of a target viewer through the broadcast platform system 20 to compare an action of a viewer shown in the video of the viewer and an action of a broadcaster shown in the video of the broadcaster. In this case, the action recognition unit 120 of the server 100 may calculate the similarity of the action using an action similarity comparison model, and the mission performance determination unit 130 may determine that the mission performance has been completed when a similarity greater than or equal to a predetermined reference value is calculated. The action (operation) similarity comparison model may be a model that obtains a posture sequence from each subject's operation (joint movement) and then calculates the similarity between the sequences by applying a dynamic time warping (DTW) algorithm. In this case, a viewer may arrange a video of a broadcaster and a video of the viewer left and right through a broadcast reception application (app) installed on the viewer terminal 30 to compare his/her action/audio and the action/audio of the broadcaster. In addition, a viewer may watch a broadcast video by arranging an enlarged form of his/her appearance and an appearance of a viewer different from the broadcaster in a grid pattern (video conference method) through the application, in which a broadcast screen may be configured with one broadcaster and N viewers. When a broadcaster performs a broadcast with content following a viewer, the broadcaster may perform following by designating a viewer specifying the broadcaster. The broadcast screen may be configured by arranging the viewer and the broadcaster left and right or by displaying the viewer and broadcaster to overlap.

The server 100 may determine whether the video of the broadcaster matches the video of the viewer for a certain period of time designated by the broadcaster or the viewer, and when it determines that the video of the broadcaster matches the video of the viewer, the server 100 pays a donation to the broadcaster.

Figure 2:
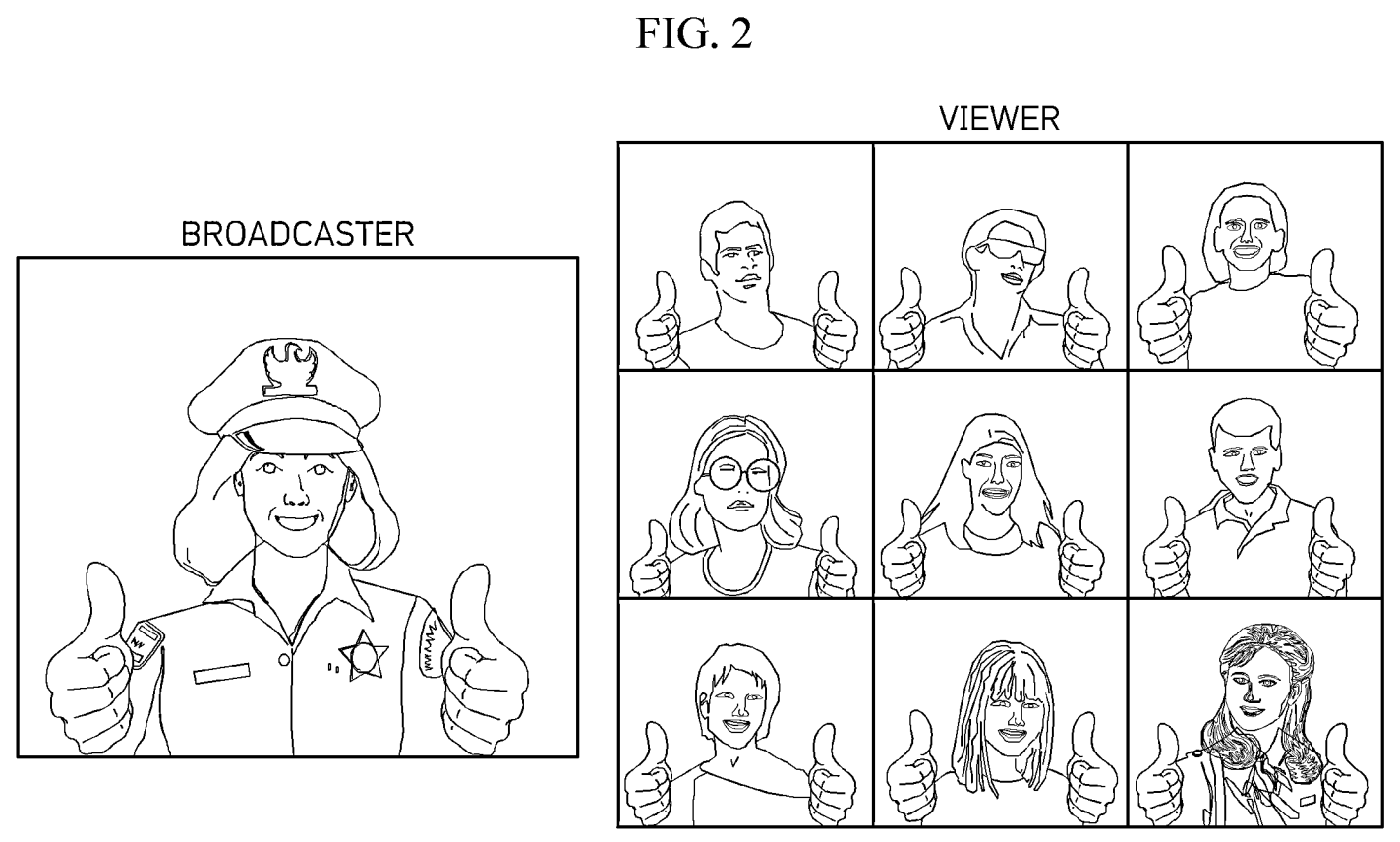

② When a viewer performs a broadcast with content following a broadcaster (see FIG. 2), the broadcaster transmits mission request information ("the viewer follows the action of the broadcaster," "the viewer follows the broadcaster's words") and donation (or prize money) deposit information to the sponsorship management unit 110 of the server 100 through the broadcaster terminal 10 directly or via the broadcast platform system 20. The server 100 may collect the video/audio of the broadcaster from the broadcaster terminal 10, collect the video/audio of the viewer from the viewer terminal 30, determine the viewer who performs the mission through real-time action/audio analysis, and pay a donation (prize money) to the corresponding viewer. When the sponsorship management unit 110 of the action server 100 receives the mission performance completion information from the mission performance determination unit 130 of the server 100, the sponsorship management unit 110 transmits the mission performance completion information to the broadcast platform system 20. The broadcast platform system 20 may synthesize the mission performance completion information with video and transmit the video to the plurality of viewer terminals 30. The server 100 may utilize the action similarity comparison model described above in ① to determine whether the mission performance has been completed. In addition, while the server 100 has been assigned control authority over the viewer IoT device 61 in advance, the server may control the viewer IoT device 61 through a wired/wireless network such as the Internet through the IoT control unit 140 according to the predetermined conditions such as the completion or failure of the mission performance.

A specific example of ② will be described. The broadcaster transmits the mission request information "a viewer follows words of a broadcaster" to the sponsorship management unit 110 through the broadcaster terminal 10, and accumulates a certain amount of prize money in the sponsorship management unit 110. When a broadcaster says to a viewer through a broadcast, "Let's start our day with positivity. Shall we all shout together? Let's do our best!," the viewer will say "Let's do our best!" on the smartphone or PC of the viewer. The server 100 or the viewer terminal 30 collects the video and audio of the broadcaster and the viewer from the broadcaster terminal 10 and the viewer terminal 30. The server 100 or the viewer terminal 30 recognizes the audio and calculates the audio similarity by comparing the audio recognition result of the broadcaster and the audio recognition result of the viewer, and determines that the mission performance is completed when the calculated similarity is greater than or equal to the predetermined similarity value. When it is determined that a number of viewers have completed the mission performance, the sponsorship management unit 110 performs processing so that a predetermined amount of prize money is paid to the viewers who performed the mission. In addition, broadcasters who use exercise as content may reward viewers with a small amount of prize money when the viewers assume the same exercise posture as the broadcasters do. In this way, it can be used in various campaigns, etc.

Meanwhile, in the Internet broadcasting system, there is a channel point system. The channel points are points accumulated through activities such as viewers' broadcast viewing times, channel subscriptions, and broadcaster following. Viewers may use channel points and receive rewards accordingly. Examples of rewards include a right to use a specific emoticon, a right to modify emoticons, sending messages in a subscriber-only mode, emphasizing one's own message, etc., and the channel points required for rewards and specific details of rewards may be set by the broadcaster who performs a broadcast on the corresponding channel. When viewers perform broadcasts with content following the broadcasters, the broadcasters may provide not only the prize money but also the channel points or the items commonly used on the broadcast platform to viewers who successfully complete the mission.

Figure 3:
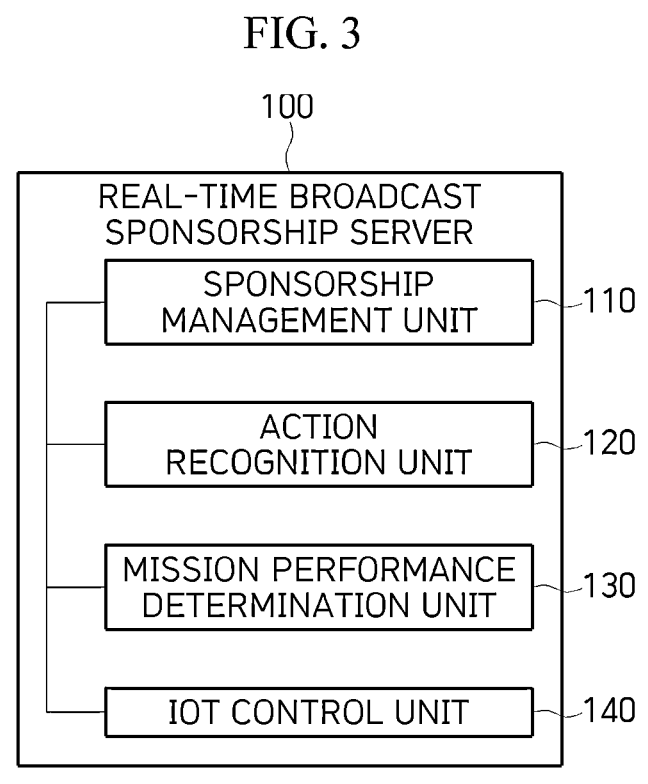

FIG. 3 is a block diagram illustrating the configuration of the real-time broadcasting system according to the first embodiment of the present invention.

As illustrated in FIG. 3, the real-time broadcasting sponsorship server 100 according to the first embodiment of the present invention includes a sponsorship management unit 110, an action recognition unit 120, and a mission performance determination unit 130. In addition, the server 100 may further include an IoT control unit 140.

The sponsorship management unit 110 provides the viewer terminal 30 with a list (mission list) of actions (missions) that the viewer may request from the broadcaster, allowing the viewer to select the mission. The sponsorship management unit 110 may provide the mission list directly to the viewer terminal 30 or indirectly through the broadcast platform system 20.

Examples of the missions include: "making an arm heart," "making a finger heart," "hurrah posture," "equestrian posture," "calyx posture," "happy expression," "laughing," "sad expression," "pretending to cry" "dancing," "singing a song," "saying congratulations," "saying a specific word (a word included in mission request information)," "speaking in a male voice," "speaking in a female voice," "scolding," "acting like a gangster," "doing squats for 1 minute," etc. It is determined whether this mission is achieved according to the operation of the action recognition unit 120 and the mission performance determination unit 130, and the artificial intelligence may be used for the recognition and determination.

The sponsorship management unit 110 collects the mission request information and the donation deposit information from the viewer terminal 30 or the broadcast platform system 20, and matches the mission request information with the donation deposit information. The sponsorship management unit 110 combines the mission request information and the donation deposit information collected for a predetermined period of time and transmits the synthesized mission request information and donation deposit information to the broadcaster terminal 10 and the broadcast platform system 20. In addition, the sponsorship management unit 110 transmits the mission request information to the mission performance determination unit 130.

When the sponsorship management unit 110 receives the mission performance completion information from the mission performance determination unit 130, the sponsorship management unit 110 transmits the mission performance completion information to the broadcast platform system 20. The broadcast platform system 20 may synthesize the mission performance completion information with video and transmit the video to the plurality of viewer terminals 30. The sponsorship management unit 110 may transmit the information ("donation payment information") that the donation/sponsorship item is paid along with the mission performance completion information to the broadcast platform system 20. In this case, the broadcast platform system 20 may synthesize the mission performance completion information and the donation payment information with video and transmit the video to the plurality of viewer terminals 30.

In addition, the sponsorship management unit 110 performs processing so that the deposited donation or sponsorship item matching the mission request information is paid to the broadcaster who performs the mission according to the mission performance completion. That is, when the viewer terminal 30 deposits a donation into an account managed by the sponsorship management unit 110 or the viewer terminal 30 purchases a sponsorship item through the sponsorship management unit 110, the sponsorship management unit 110 performs processing so that all or part of the donation or sponsorship item matching the mission is paid to the broadcaster when the mission performance of the broadcaster is completed. Meanwhile, when the broadcast platform system 20 manages the donation deposit or the viewer terminal 30 purchases the sponsorship item through the broadcast platform system 20, the sponsorship management unit 110 transmits a message requesting the payment of the donation or sponsorship item matching the corresponding mission to the broadcast platform system 20 when the mission performance of the broadcaster is completed.

Meanwhile, the sponsorship management unit 110 may differentially pay the donation or sponsorship item to the broadcaster according to the probability ("action probability") that the broadcaster performs the action required in the mission even when the mission performance has been completed.

In addition, when the IoT control unit 140 is included in the server 100, the sponsorship management unit 110 transmits the mission performance completion information to the IoT control unit 140. In this case, the sponsorship management unit 110 may transmit the donation payment information to the IoT control unit 140 along with the mission performance completion information.

The action recognition unit 120 collects at least one of the video in which the broadcaster appears and the audio of the broadcaster from the broadcaster terminal 10, and recognizes the action (including facial expression and posture) of the broadcaster through the analysis. For example, the action recognition unit 120 may classify the posture of the broadcaster appearing in the video collected by the broadcasting camera 40 for each frame and recognize the action of the broadcaster based on the change in posture according to the sequence progress.

The action recognition unit 120 may collect any one of the video and audio of the broadcaster from the broadcast platform system 20 or the broadcasting camera 40 and microphone 50 instead of the broadcaster terminal 10.

In addition, the action recognition unit 120 may recognize the action of the broadcaster using a neural network trained through a deep learning technique. For example, the action recognition unit 120 may define a graph structure that connects the same nodes along the time axis, with joints constituting a skeleton as nodes and bones connecting the joints as edges, and recognize the operation of the broadcaster using a motion recognition model generated by training a graph convolutional neural network (GCN). In addition, the action recognition unit 120 may recognize the audio of the broadcaster by converting the audio into text using the audio recognition model to which the deep learning technique such as a long short-term memory (LSTM) neural network is applied. Audio recognition models (sound recognition models) used by the action recognition unit 120 include a general audio recognition model, and also include a model that extracts audio features, generates a feature vector, and applies an acoustic model to the generated feature vector to classify the pattern. For example, the action recognition unit 120 may recognize the audio features or patterns, such as gender, age, and pronunciation state, in the audio of the broadcaster. As an audio feature extraction method, methods such as linear predictive coefficient, fast Fourier transform (FFT), cepstrum, Mel frequency cepstral coefficient (MFCC), and energy for each frequency band may be used. An acoustic model (pattern classification model) may be constructed using deep learning.

The action recognition unit 120 may combine the action recognition result and the audio recognition result to recognize the action of the broadcaster. In addition, the action recognition unit 120 may recognize the action of the broadcaster using the action recognition model that is an ensemble of the motion recognition model and the audio recognition model. Examples of the deep learning technique that the action recognition unit 120 may use to recognize the action or audio may include techniques such as a hidden Markov model (HMM), a convolutional neural network (CNN), a graph convolutional neural network (GCN), a fully connected deep neural network (DNN), a dynamic Bayesian network (DBN), a conditional random field (CRF), ensemble TS-LSTM, ST-GCN, AS-GCN, Wav2Vec, and SincNet.

The action recognition unit 120 may include a separate training module 121. In this case, the training module 121 trains a deep learning network using the video and audio of the broadcaster as input and the name of the action that may be used in the mission list as a label (output) to generate the action recognition model.

The action recognition unit 120 recognizes the action of the broadcaster using at least one of the video and audio collected from the broadcasting camera 40 and the microphone 50, and transmits the action recognition result to the mission performance determination unit 130. The action recognition result may be the name of the action, and may be the form in which the name of the action and the probability value ("action probability") of performing that action are matched. For example, the action recognition result may be "making a finger heart" or "making a finger heart, 80%."

Meanwhile, the action recognition unit 120 may be further equipped with a video analysis model (object detection, object recognition), an optical character recognition model (OCR), a shore-line detection model, and a sea-land segmentation The present invention was derived from the above background, model as well as the motion recognition model and the audio recognition model. Therefore, the action recognition unit 120 may detect the posture and facial expression of the broadcaster as well as the number of objects or words/sentences appearing in the video, and transmits this detection content to the mission performance determination unit 130 to determine whether or not the mission is performed. For example, in the case of outdoor broadcasting, the content of the mission request information may be a visit to a specific franchise cafe. In this case, when the broadcaster goes in front of the cafe, the action recognition unit 120 may detect and recognize words in a cafe signboard appearing in the video of the broadcaster, and the mission performance determination unit 130 may determine that the mission has been performed when this word is included in the mission request information. In this way, it is possible to determine whether missions such as placing a doll in a studio (0.01 won per second) or entering water are performed.

In addition, when the mission request information is "following the action of a viewer (a specific viewer is designated)," or "a viewer following the action of the broadcaster," the action recognition unit 120 may compare the action (operation) of the viewer appearing in the video of the viewer and the action of the broadcaster appearing in the video of the broadcaster by directly receiving the video of the viewer from the target viewer terminal 30 or receiving the video of the viewer through the broadcast platform system 20 to calculate the similarity. In this case, the action recognition unit 120 may calculate the similarity of the action using an action similarity comparison model, and the mission performance determination unit 130 may determine that the mission performance has been completed when a similarity greater than or equal to a predetermined reference value is calculated. The action (operation) similarity comparison model used in the action recognition unit 120 may be a model that obtains a posture sequence from each subject's operation (joint movement) and then calculates the similarity between the sequences by applying a dynamic time warping (DTW) algorithm.

The mission performance determination unit 130 compares the mission request information received from the sponsorship management unit 110 with the action recognition result received from the action recognition unit 120 to determine whether the mission request information matches the action recognition result. When there is an action matching the action recognition result among the mission request information, the mission performance determination unit 130 transmits the information (mission performance completion information) that the mission performance has been completed for the specific mission to the sponsorship management unit 110. In this case, the mission performance determination unit 130 may transmit the action probability among the action recognition results to the sponsorship management unit 110 along with the mission performance completion information.

The IoT control unit 140 controls the broadcast auxiliary IoT device 60 when the real-time broadcasting system includes the broadcast auxiliary IoT device 60. That is, the IoT control unit 140 may generate a control signal that operates the broadcast auxiliary IoT device 60 under the predetermined conditions and transmit the generated control signal to the broadcast auxiliary IoT device 60 through the wired/wireless communication. For example, when the broadcast auxiliary IoT device 60 is an air conditioner, the IoT control unit 140 may operate the air conditioner 60 for a certain period of time upon receiving the mission performance completion information from the sponsorship management unit 110. In addition, when the broadcast auxiliary IoT device 60 is a money gun, the IoT control unit 140 may control the money gun 60 by receiving the mission performance completion information and the donation payment information from the sponsorship management unit 110 to discharge a certain amount of banknotes.

FIG. 4 is a block diagram illustrating a configuration of a real-time broadcasting system according to a second embodiment of the present invention and FIG. 5 is a block diagram illustrating the configuration of the real-time broadcasting system according to the second embodiment of the present invention.

In the second embodiment of the present invention, a real-time broadcasting sponsorship server 100' collects video or audio of a broadcaster using a separate action recognition IoT device 70 for an action of broadcaster recognition, and performs the action recognition based on the collected audio, thereby increasing the action recognition accuracy.

As illustrated in FIG. 4, a real-time broadcasting system 1' according to a second embodiment of the present invention includes a broadcaster terminal 10, a broadcast platform system 20, a viewer terminal 30, a broadcasting camera 40, a microphone 50, a real-time broadcasting sponsorship server 100 (hereinafter abbreviated as "server"), and an action recognition IoT device 70, and may further include a broadcast auxiliary IoT device 60.

There is a difference between the real-time broadcasting system 1 and the real-time broadcasting system 1' in terms of the method of collecting video and audio of a broadcaster for action recognition, and there may also be differences in terms of the amount of information in video data and its processing method. Hereinafter, the description will focus on the differences between the real-time broadcasting system 1 and the real-time broadcasting system 1'.

The server 100' collects at least one of the video and audio of the broadcaster from the action recognition IoT device 70 for the action of broadcaster recognition. The action recognition IoT device 70 is a camera or a microphone to which the IoT technology is applied, and may be an IoT device equipped with both the camera and the microphone. The action recognition IoT device 70 is located near the broadcaster terminal 10 and collects the video or audio of the broadcaster separately from the broadcasting camera 40 or the microphone 50 and provides the collected video or audio to the server 100'.

The action recognition IoT device 70 may be a 3D depth camera. For reference, the 3D depth camera technology is a technology of acquiring depth information of each pixel of an image. The 3D depth camera that may be used as the action recognition IoT device 70 may be any of a stereo type, a time-of-flight (ToF) type, a structured pattern type, or a hybrid type in which these techniques are combined, but the scope of the present invention is not limited thereto.

The server 100' includes a sponsorship management unit 110, an action recognition unit 120', and a mission performance determination unit 130, and may further include an IoT control unit 140. The action recognition unit 120' of the server 100' may include a separate learning module. In this case, the training module of the action recognition unit 120' may train a deep learning network using the video and audio of the broadcaster as input and the name of the action that may be used in the mission list as a label (output) to generate the action recognition model. In addition, the training module of the action recognition unit 120' may train a deep learning network using datasets such as NTU RGB+D or motion data generated by kinetic-generative adversarial network (kinetic-GAN) to generate the action recognition model.

The action recognition unit 120' collects at least one of the video and audio in which the broadcaster appears from the action recognition IoT device 70 instead of the broadcasting camera 40. When the action recognition IoT device 70 is a 3D depth camera, the action recognition unit 120' may effectively train the action recognition model by performing learning and inference using the depth information of each part of the body of the broadcaster that is the target of recognition, and may increase the accuracy of action recognition (inference).

Figure 6:
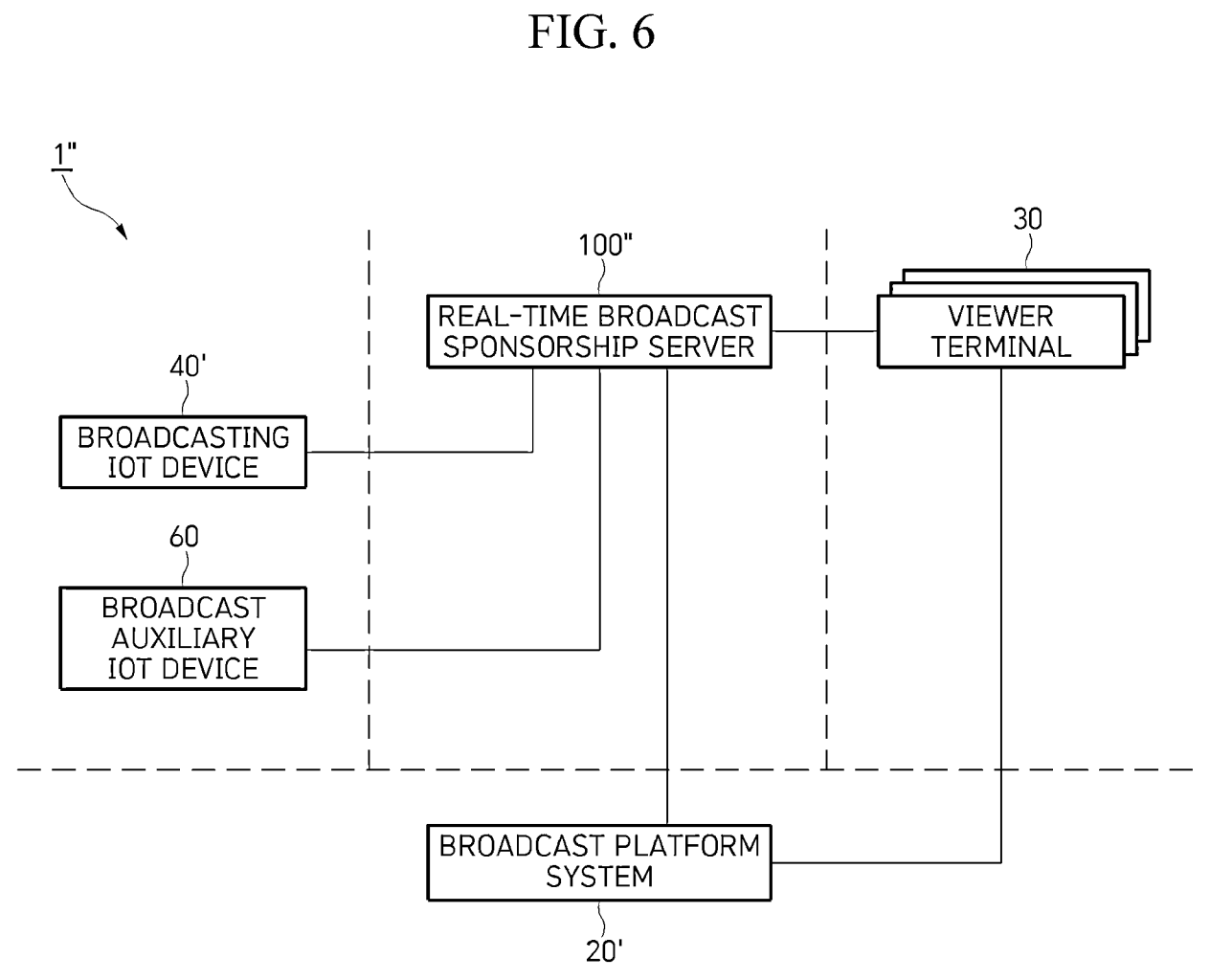

FIG. 6 is a block diagram illustrating a configuration of a real-time broadcasting system according to a third embodiment of the present invention, and FIG. 7 is a block diagram illustrating the configuration of the real-time broadcasting system according to the third embodiment of the present invention.

According to the third embodiment of the present invention, a real-time broadcasting sponsorship server 100" also performs a function of a broadcaster terminal.

As illustrated in FIG. 6, a real-time broadcasting system 1" according to the third embodiment of the present invention includes a broadcaster platform system 20', a viewer terminal 30, a broadcast IoT device 40', and a real-time broadcasting sponsorship server 100" (hereinafter abbreviated as "server"), and may further include a broadcast auxiliary IoT device 60.

There is a difference between the real-time broadcasting system 1 and the real-time broadcasting system 1" in terms of a generation subject of broadcast content and a data collection method for an action of broadcaster recognition. Hereinafter, the description will focus on the differences between the real-time broadcasting system 1 and the real-time broadcasting system 1".

The server 100" receives broadcast video and audio from the broadcasting IoT device 40' through wired or wireless communication and generates content for broadcasting in real time. However, the broadcaster terminal 10 is not limited thereto, and may receive already generated content from the outside. The broadcasting IoT device 40" is a device to which the IoT technology is applied and is equipped with a broadcasting camera and a microphone to be able to transmit the video and audio to the server 100" through a wired/wireless communication network. The server 100" transmits broadcast content to the broadcast platform system 20' so that streaming broadcasting may be performed.

When the viewer terminal 30 transmits mission request information and donation deposit information to the server 100" directly or through the broadcast platform system 20', the server 100" combines one or more types of mission request information and donation deposit information received by the broadcast platform system 20' and transmits the combined mission request information and donation deposit information to the viewer terminal 30 directly or through the broadcast platform system 20'. The broadcaster may recognize the mission request information and the donation deposit information using one of the plurality of viewer terminals 30.

The server 100" includes a sponsorship management unit 110, an action recognition unit 120", a mission performance determination unit 130, and a broadcast content generation unit 150, and may further include an IoT control unit 140.

The action recognition unit 120" recognizes the action of the broadcaster based on the video and audio collected from the broadcasting IoT device 40', and the broadcast content generation unit 150 generates broadcast content based on the video and audio collected from the broadcasting IoT device 40' and transmits the generated broadcast content to the broadcast platform system 20'.

Figure 8:
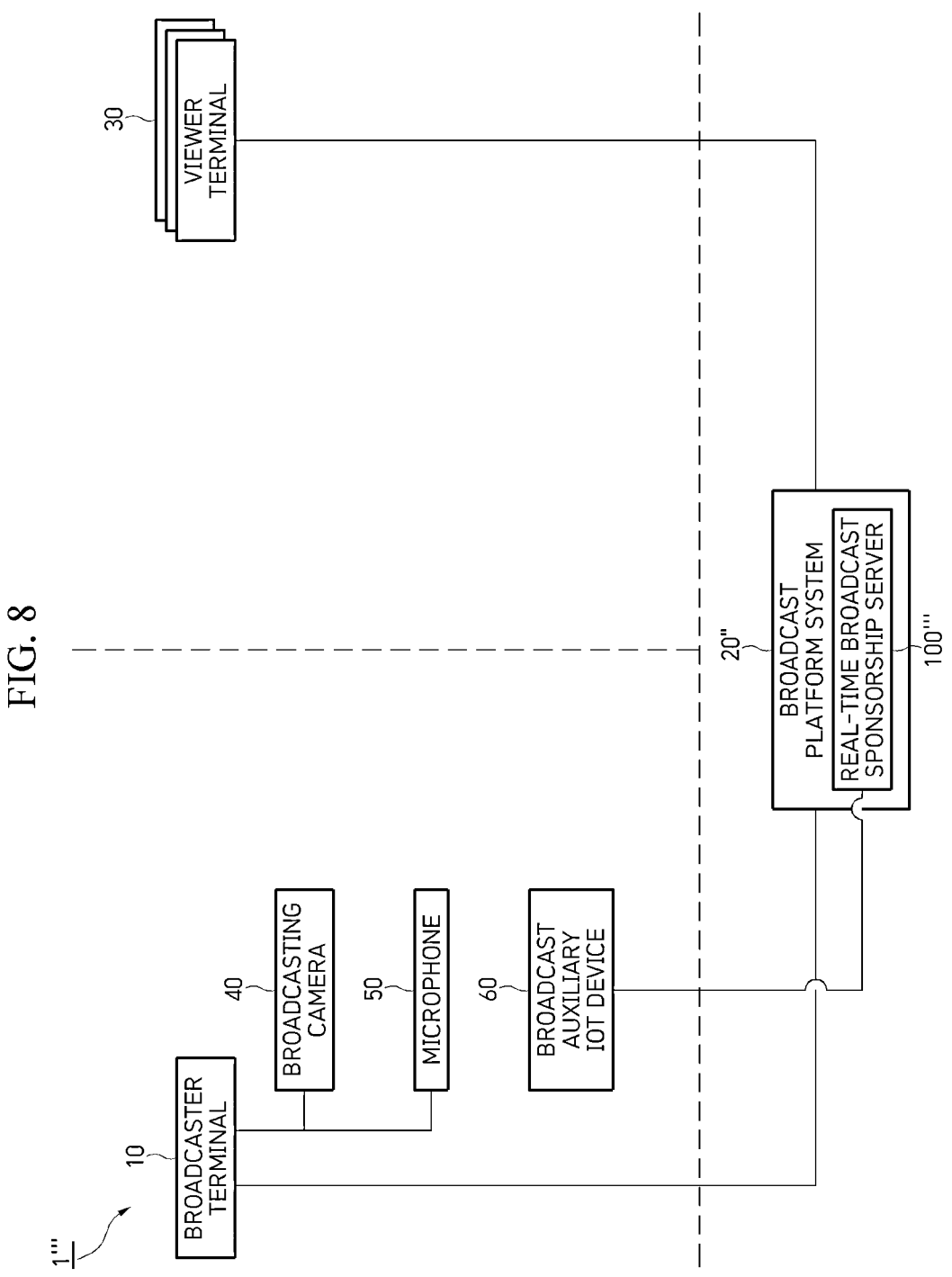
FIG. 8 is a block diagram illustrating a configuration of a real-time broadcasting system according to a fourth embodiment of the present invention.

FIG. 8 is a block diagram illustrating a configuration of a real-time broadcasting system according to a fourth embodiment of the present invention.

In the fourth embodiment of the present invention, a real-time broadcasting sponsorship server 100" is included in the broadcast platform system 20", and the broadcast platform system 20" collects mission request information and donation deposit information and has a function of determining whether a mission is performed through an action of broadcaster recognition.

As illustrated in FIG. 8, a real-time broadcasting system 1" according to a fourth embodiment of the present invention includes a broadcaster terminal 10, a broadcast platform system 20", a viewer terminal 30, a broadcasting camera 40, a microphone 50, and may further include a broadcast auxiliary IoT device 60. The broadcast platform system 20" includes the real-time broadcasting sponsorship server 100" (hereinafter abbreviated as "server").

Hereinafter, the description will focus on the differences between the real-time broadcasting system 1 and the real-time broadcasting system 1".

The server 100" included in the broadcast platform system 20" collects, from the viewer terminal 30, information on a mission ("mission request information") and donation deposit information requested by the viewer from the Internet broadcaster, recognizes the action of the broadcaster based on the broadcast content, compares the action recognition result with the mission included in the mission request information, and when it determines that the mission has been completed, processes the payment of the donation or transmits the mission performance completion information to the donation processing unit separately included in the broadcast platform system 20". The donation processing unit may perform processing so that all or part of the donation is paid to the Internet broadcaster according to the mission performance completion information.

Except for the above-described differences, the configuration and function of the server 100''' are the same as those of the server 100.

Figure 9:
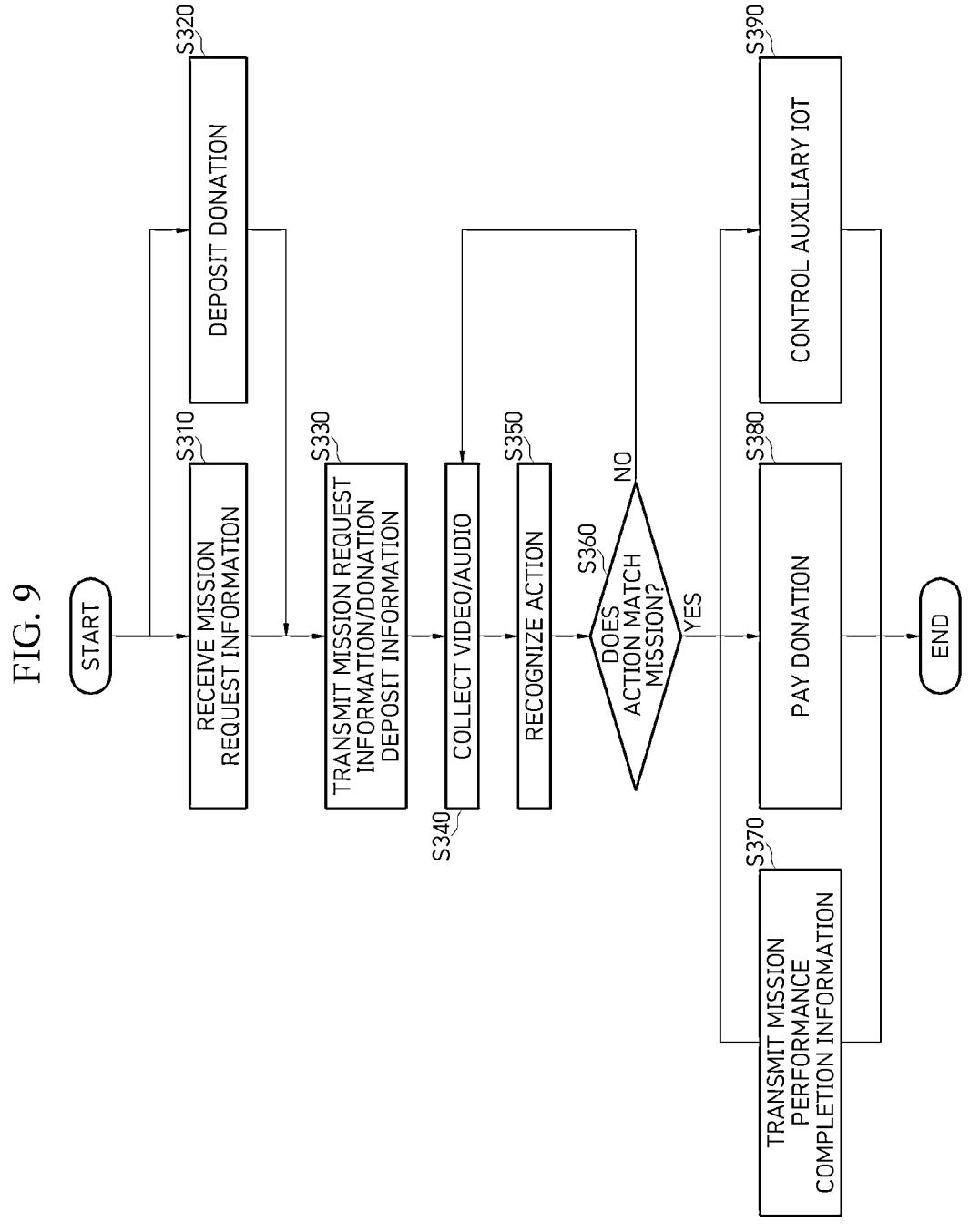
FIG. 9 is a flowchart illustrating an operation method of a real-time broadcasting sponsorship server according to an embodiment of the present invention.

FIG. 9 is a flowchart for describing an operation method of real-time broadcasting sponsorship servers 100, 100', 100'', and 100''' according to embodiments of the present invention.

The operating method of the real-time broadcasting sponsorship servers 100, 100', 100'', and 100''' according to embodiments of the present invention includes operations S310 to S380, and may further include operation S390. In addition, certain operations may be omitted in the above operating method. For example, operations S330 or S370 are operations for transmitting information to the outside and may be omitted. In addition, in the case of real-time broadcasting in which donations are not received, operations S320 and S380 may be omitted.

Operation S310 is a mission request information reception operation. The servers 100, 100', 100'', and 100''' transmit the mission list to the viewer terminal 30. The servers 100, 100', 100'', and 100''' may directly transmit the mission list to the viewer terminal 30, or transmit or deliver the mission list to the broadcast platform system 20, 20''', and 20'', and the broadcast platform systems 20, 20', and 20'' may synthesize the mission list with a broadcast video and present the broadcast video to the viewer terminal 30. When the viewer selects one of the actions listed in the mission list, the viewer terminal 30 transmits, to the servers 100, 100', 100'', and 100''', information ("mission request information") on an action requested by the viewer from the broadcaster directly or through the broadcast platform systems 20, 20', and 20'', and the servers 100, 100', 100'', and 100' receive the mission request information. When the plurality of broadcasters are broadcasting or participating in the broadcast on one Internet broadcasting channel, the mission request information may include information on a broadcaster who performs the action requested by the viewer.

Operation S320 is a donation deposit operation. The viewer terminal 30 transmits the donation deposit information to the servers 100, 100', 100'', and 100'''. The viewer terminal 30 may directly transmit the donation deposit information to the servers 100, 100', 100'', and 100''', and may transmit the donation deposit information to the servers 100, 100', 100'', and 100''' through the broadcast platform system 20. The servers 100, 100', 100'', and 100''' receive the donation deposit information and match the donation deposit information with the mission request information transmitted from the same viewer terminal 30.

Operations S310 and S320 may be performed simultaneously. For example, while a game broadcast is in progress in real time, a viewer selects one of the mission lists ("making a finger heart") appearing on the viewer terminal 30 and when the donation is deposited through the application (or app) of the viewer terminal 30, the servers 100, 100', 100'', and 100''' match the "making a finger heart" and the donation. The plurality of viewer terminals 30 may transmit the mission request information for the "making a finger heart." In this case, the servers 100, 100', 100'', and 100''' match the plurality of pieces of donation deposit information with the "making a finger heart" mission.

Operation S330 is an operation of delivering mission request information and donation deposit information.

The servers 100, 100', 100'', and 100''' combine the received mission request information and the donation deposit information and transmit or deliver the combined received mission request information and donation deposit information to the broadcaster terminal 10 or the broadcast platform system 20, 20', and 20''. When the broadcaster terminal 10 receives the mission request information and the donation deposit information, the broadcaster terminal 10 may display the mission request information and the donation deposit information on the screen, and the broadcaster may recognize the mission request information and the donation deposit information. When the broadcast platform systems 20, 20', and 20'' receive the mission request information and the donation deposit information, the broadcast platform systems 20, 20', and 20'' may synthesize the corresponding information with video and transmit the video to the plurality of viewer terminals 30 connected to the same broadcast channel.

As another example of the present invention, when selecting the mission in the viewer terminal 30, the mission may be kept secret from the broadcaster or other viewers (secret mission function). For example, the servers 100, 100', and 100''' may not transmit the mission request information and the donation deposit information to the broadcaster terminal 10. In this case, a broadcaster performs a broadcast without being aware of the mission request information, and a viewer may pay a donation when the mission is performed or get fun and enjoyment from watching the broadcaster being happy or surprised as a result of the operation of the broadcast auxiliary IoT device 60 (such as a blower). Additionally, the servers 100, 100', and 100'' may prevent the mission request information and the donation deposit information from being transmitted not only to the broadcaster terminal 10 but also to the viewer terminal 30. In other words, when a viewer assigns a mission, the broadcaster may not be informed of the mission request information (specific action or sound) and it may be made public or private to viewers, making it possible to produce more interesting content. For example, while the mission is made private, when the broadcaster says "I like it," 100 won may be added to the donation, and when the broadcaster says "It's not good," 100 won may be deducted from the donation. Additionally, the private time of the secret mission may be set when requesting the mission, and after the private time has elapsed, the broadcaster may confirm whether the mission has been performed and receive the corresponding donation.

Operation S340 is a video/audio collection operation. The servers 100, 100', 100'', and 100''' collect at least one of the video of the broadcaster and the audio of the broadcaster. At least one of the broadcaster terminal 10, the broadcast platform systems 20, 20', and 20'', the broadcasting camera 40, the broadcasting IoT device 40', the microphone 50, and the action recognition IoT device 70 may be the video or audio of the broadcaster to the servers 100, 100', 100'', and 100''.

Operation S350 is an action recognition operation. The servers 100, 100', 100'', and 100'' recognize the action of the broadcaster based on at least one of the collected video and audio of the broadcaster. When the servers 100, 100', 100'', and 100'' recognize (infer) the action of the broadcaster, the neural network trained using the deep learning technique may be used. The action recognition result may be the name of the action, and may be the form in which the name of the action and the probability value ("action probability") of performing that action are matched. For example, the action recognition result may be "making a finger heart" or "making a finger heart, 80%."

Operation S360 is an action-mission determination operation. The servers 100, 100', 100'', and 100'' determine whether the action recognition result matches the mission request information. As described above, in this specification, it is considered that the "matching" includes not only the case where the action of the broadcaster recognized by the servers 100, 100', 100", and 100'" and the action designated as the mission by the viewer match, but also the case where the probability that the action of the broadcaster is the action selected (requested) by the viewer as the mission falls within a certain range. For example, when the mission request information is "making a finger heart," the action recognition result is "making a finger heart, 80%," and the reference probability of determining "match" is 60%, it is considered that the action recognition result matches the mission request information.

As the determination result, when the action recognition result does not match the mission request information, operation S340 is performed to additionally collect the video and audio of the broadcaster for a predetermined period of time, thereby recognizing the action. For example, when the mission request information is "making a finger heart" but the action recognition result is the "making an arm heart," the mission does not match the action. In this case, when there are 3 minutes left in the mission confirmation time, the servers 100, 100', 100", and 100" collect additional video and audio of the broadcaster and recognize the action to confirm whether the mission "making a finger heart" has been achieved. When the mission is not achieved within the given period of time, the servers 100, 100', 100", and 100" process an operation of returning the deposited donation or sponsorship item to the viewer through the sponsorship management units 110 and 221.

When it is determined that the mission matches the action, it proceeds to operation S370. For example, when the mission request information and the action recognition result match "making a finger heart," operation S370 is performed.

Operation S370 is a mission performance completion information delivery operation. The servers 100, 100', 100", and 100" transmit or deliver the mission performance completion information to the broadcast platform systems 20, 20', and 20". The broadcast platform systems 20, 20', and 20" may synthesize the mission performance completion information with video and transmit the video to the plurality of viewer terminals 30. In addition, the servers 100, 100', 100", and 100'" may transmit or deliver the information (hereinafter referred to as "donation payment information") that the donation/sponsorship item is paid along with the mission performance completion information to the broadcast platform system 20. In this case, the broadcast platform systems 20, 20', and 20" may synthesize the mission performance completion information and the donation payment information with video and transmit the video to the plurality of viewer terminals 30.

Operation S380 is a donation payment operation. The servers 100, 100', 100", and 100" perform processing so that all or part of the deposited donation or sponsorship item is paid to the broadcaster who performs the mission. When the broadcast platform systems 20, 20', and 20" manage the donation deposit or the viewer terminal 30 purchases the sponsorship item through the broadcast platform systems 20, 20', and 20", the servers 100, 100', 100", and 100" transmit a message requesting the payment of the donation or sponsorship item to the broadcast platform systems 20, 20', and 20".

Operation S390 is an auxiliary IoT control operation. The servers 100, 100', 100", and 100" may generate a control signal and transmit the generated control signal to the broadcast auxiliary IoT device 60 when the mission performance is completed to operate the broadcast auxiliary IoT device 60. For example, the servers 100, 100', 100", and 100' may turn on the air conditioner 60 for a certain period of time or change the set temperature, and discharge banknotes by the amount to be paid to the broadcaster from the money gun 60.

Meanwhile, in the above description, operations S310 to S390 may be further divided into additional operations or combined into fewer operations according to an embodiment of the present invention. Also, some operations may be omitted if necessary, and an order between operations may be changed. In addition, the content of FIGS. 1 to 8 may be applied to the content of FIG. 9 even when other content is omitted. In addition, the content described with reference to FIG. 9 may be applied to FIGS. 1 to 8.

For reference, the components according to the embodiment of the present invention may be implemented in the form of software or hardware such as a digital signal processor (DSP), a field programmable gate array (FPGA), or an application specific integrated circuit (ASIC), and perform predetermined roles.

However, "components" are not limited to software or hardware, and each component may be configured to be in an addressable storage medium or to reproduce one or more processors.

Accordingly, for example, the component includes components such as software components, object-oriented software components, class components, and task components, processors, functions, attributes, procedures, subroutines, segments of a program code, drivers, firmware, a microcode, a circuit, data, a database, data structures, tables, arrays, and variables.

Components and functions provided within the components may be combined into a smaller number of components or further divided into additional components.

Meanwhile, it will be appreciated that each block of a processing flowchart and combinations of the flowcharts may be executed by computer program instructions. Since these computer program instructions may be mounted in a processor of a general computer, a special computer, or other programmable data processing apparatuses, these computer program instructions executed through the process of the computer or the other programmable data processing apparatuses create means performing functions described in a block(s) of the flow chart. Since these computer program instructions may also be stored in a computer usable or computer readable memory of a computer or other programmable data processing apparatuses in order to implement the functions in a specific scheme, the computer program instructions stored in the computer usable or computer readable memory can also produce manufacturing articles including instruction means performing the functions described in the block(s) of the flowchart. Since the computer program instructions may also be mounted on the computer or the other programmable data processing apparatuses, the instructions performing a series of operation steps on the computer or the other programmable data processing apparatuses to create processes executed by the computer, thereby executing the computer or the other programmable data processing apparatuses may also provide steps for performing the functions described in a block(s) of the flowchart.

In addition, each block may indicate some of modules, segments, or codes including one or more executable instructions for executing a specific logical function (specific logical functions). Further, it is to be noted that functions mentioned in the blocks occur out of sequence in some alternative embodiments. For example, two blocks that are sequentially illustrated may be simultaneously performed in fact or be performed in a reverse sequence depending on corresponding functions.

In this case, the term "unit" used in the present embodiment means software or hardware components such as FPGA or ASIC, and a "unit" performs certain roles. However, the "unit" is not meant to be limited to software or hardware. The "unit" may be configured to be stored in a storage medium that can be addressed or may be configured to regenerate one or more processors. Accordingly, as an example, "unit" refers to components such as software components, object-oriented software components, class components, and task components, processes, functions, attributes, procedures, subroutines, segments of program code, drivers, firmware, microcode, circuits, data, databases, data structures, tables, arrays and variables. Components and functions provided within a "unit" may be combined into a smaller number of components and "units" or may be further separated into additional components and "units." In addition, components and "units" may be implemented to play one or more CPUs in a device or a secure multimedia card.

The operation method of the above-described real-time broadcasting sponsorship servers 100, 100', 100", and 100" was described with reference to the flowchart illustrated in the drawings. For simplicity, the method has been illustrated and described as a series of blocks, but the invention is not limited to the order of the blocks, and some blocks may occur at the same time as other blocks or in a different order from that illustrated and described in the present specification. Also, various other branches, flow paths, and orders of blocks that achieve the same or a similar result may be implemented. In addition, all the illustrated blocks may not be required for implementation of the methods described in the present specification.

Although the configuration of the present invention has been described in detail above with reference to the accompanying drawings, this is merely an example, and those skilled in the art to which the present invention pertains can make various modifications and changes within the scope of the technical spirit of the present invention. Accordingly, it is to be understood that the scope of the present invention will be defined by the claims rather than the above description and all modifications and alternations derived from the claims and their equivalents are included in the scope of the present invention.

DESCRIPTION OF REFERENCE NUMERALS

1, 1', 1", 1'": Real-time broadcasting system
10: Broadcaster terminal
20, 20', 20": Broadcast platform system
30: Viewer terminal
40: Broadcasting camera
40': Broadcasting IoT device
50: Microphone
60: Broadcast auxiliary IoT device
70: Action recognition IoT device
100, 100', 100", 100'": Real-time broadcasting sponsorship server
110: Sponsorship management unit
120, 120', 120": Action recognition unit
130: Mission performance determination unit
140: IoT control unit
150: Broadcast content generation unit

The invention claimed is:

1. A real-time broadcasting sponsorship server based on automatic action recognition, comprising:
   a sponsorship management circuit that collects information on a mission and donation deposit information requested by an Internet broadcast viewer from an Internet broadcaster and processes payment of the donation when the mission is completely performed;
   an action recognition circuit that recognizes an action of the broadcaster based on at least one of video or audio of the broadcaster to generate an action recognition result;
   a mission performance determination circuit that compares the action recognition result with the information on the mission to determine whether the mission is completely performed; and
   an Internet of Things (IoT) control circuit that controls an auxiliary IoT device to produce a physical effect in a surrounding environment based upon the recognized action of the broadcaster.

2. The real-time broadcasting sponsorship server of claim 1, wherein the Internet of Things (IoT) control circuit controls a viewer IoT device of the Internet broadcast viewer to produce a physical effect in a surrounding environment based upon the recognized action of the viewer.

3. The real-time broadcasting sponsorship server of claim 1, wherein the information on the mission is a name of at least one of an operation, a facial expression, or a posture requested by the Internet broadcast viewer from the broadcaster.

4. The real-time broadcasting sponsorship server of claim 1, wherein the information on the mission is at least one of a moving image or an image related to the action requested by the Internet broadcast viewer from the broadcaster.

5. A real-time broadcasting sponsorship system based on automatic action recognition, comprising:
   an action recognition Internet of Things (IoT) device that collects at least one of video or audio of an Internet broadcaster;
   a server that collects information on a mission and donation deposit information requested by an Internet broadcast viewer from the Internet broadcaster, recognizes an action of the broadcaster based on at least one of video or audio of the broadcaster to generate an action recognition result, compares the action recognition result with the information on the mission to determine whether the mission is completely performed, and processes payment of the donation; and
   an auxiliary IoT device that produces a physical effect in a surrounding environment, wherein the real-time broadcasting sponsorship system is configured to control the auxiliary IoT device to produce the physical effect in the surrounding environment based upon the at least one of video or audio of the broadcaster.

6. The real-time broadcasting sponsorship system of claim 5, wherein the action recognition IoT device acquires depth information on each part of a body of the broadcaster.

7. A real-time broadcasting system comprising:
   a broadcast platform system:
   a broadcaster terminal that generates broadcast content in which an Internet broadcaster appears and transmits the generated broadcast content to the broadcast platform system; and
   a viewer terminal that receives the broadcast content from the broadcast platform system and provides the received broadcast content to a viewer of the broadcast content, wherein the broadcast platform system collects, from the viewer terminal, information on a mission and donation deposit information that the viewer requests from the broadcaster and processes payment of the donation when it is determined that the mission is completed based on the broadcast content; and an auxiliary Internet of Things (IoT) device that produces a physical effect in a surrounding environment, wherein the real-time broadcasting system configured to control the auxiliary IoT device to produce the physical effect in a surrounding environment based upon the generated broadcast content.

8. A real-time broadcasting sponsorship server based on automatic action recognition, comprising:

a sponsorship management circuit that collects information on a mission presented by any one of an Internet broadcaster or an Internet broadcast viewer and information on a reward for the mission, and processes payment of the reward when the mission is completely performed;

an action recognition circuit that calculates action similarity between the broadcaster and the viewer based on a moving image of the broadcaster and a moving image of the viewer;

an Internet of Things (IoT) control circuit that controls an auxiliary IoT device to produce a physical effect in a surrounding environment based upon the moving image of the broadcaster; and a mission performance determination circuit that determines whether the mission is completely performed depending on whether the action similarity falls within a predetermined range, wherein the information on the reward is at least one of prize money or a channel point under a condition on the performance completion of the mission.

9. A real-time broadcasting sponsorship server comprising:

a sponsorship management circuit that collects information on a mission and donation deposit information requested by an Internet broadcast viewer from an Internet broadcaster and processes payment of the donation when the mission is completely performed;

a recognition circuit that recognizes at least one of an object or a character appearing in a moving image of the broadcaster and generates a recognition result;

a mission performance determination circuit that determines whether the mission is completely performed depending on whether the recognition result matches the information on the mission; and an Internet of Things (IoT) control circuit that controls an auxiliary IoT device to produce a physical effect in a surrounding environment based upon the recognition result.

10. An operation method of a real-time broadcasting sponsorship server, comprising:

a mission request information receiving operation of receiving mission request information from a viewer terminal;

a video/audio collection operation of collecting at least one of video or audio of an Internet broadcaster;

an action recognition operation of generating an action recognition result of the broadcaster based on at least one of the video or audio of the broadcaster;

an action-mission matching determination operation of determining whether the action recognition result matches the mission request information; and an auxiliary Internet of Things (IoT) control operation of operating an auxiliary IoT device to produce a physical effect in a surrounding environment based upon the at least one of video or audio of the Internet broadcaster.

11. The operation method of claim 10, further comprising:

before the video/audio collection operation, a donation deposit operation of receiving donation deposit information from the viewer terminal and matching the received donation deposit information with the mission request information, and after the action-mission matching determination operation, when the action recognition result matches the mission request information, a donation payment operation of processing the donation to be paid to the broadcaster in one of full payment and partial payment.

12. The operation method of claim 10, further comprising, a viewer IoT control operation of operating a viewer IoT device of an Internet broadcast viewer to produce a physical effect in a surrounding environment based upon the recognized action of the viewer.

13. The operation method of claim 10, wherein, in the action recognition operation, an action of the broadcaster is recognized through a neural network trained using a deep learning technique.

* * * * *